(12) United States Patent
Bonnabaud

(10) Patent No.: US 7,700,681 B2
(45) Date of Patent: Apr. 20, 2010

(54) RESONANCE DECOUPLING DEVICE FOR PROTECTING A HUMAN OR ANIMAL BODY AND METHOD OF PROTECTING AGAINST ELECTROMAGNETIC SIGNALS

(76) Inventor: Mari-Claude Bonnabaud, 3 place Caire, F-13012, Marseille (FR)

( * ) Notice: Subject to any disclaimer, the term of this patent is extended or adjusted under 35 U.S.C. 154(b) by 1263 days.

(21) Appl. No.: 10/463,278

(22) Filed: Jun. 17, 2003

(65) Prior Publication Data

US 2004/0012846 A1    Jan. 22, 2004

Related U.S. Application Data

(63) Continuation of application No. PCT/FR01/04041, filed on Dec. 18, 2001.

(51) Int. Cl.
*C08K 3/10*    (2006.01)

(52) U.S. Cl. .................. 524/434; 524/435; 524/436; 524/437; 524/439; 524/441

(58) Field of Classification Search .................. 523/137; 524/434, 435, 436, 437, 439, 440.441
See application file for complete search history.

(56) References Cited

U.S. PATENT DOCUMENTS

| | | | |
|---|---|---|---|
| 3,568,196 A | | 3/1971 | Bayrd et al. |
| 4,414,339 A | | 11/1983 | Solc et al. |
| 5,360,666 A | * | 11/1994 | Eichmiller .................. 428/327 |

FOREIGN PATENT DOCUMENTS

WO    WO 85/02265 A    5/1985

* cited by examiner

*Primary Examiner*—Edward J Cain
(74) *Attorney, Agent, or Firm*—DLA Piper LLP (US)

(57) ABSTRACT

A resonance decoupling device for protecting a human or animal body including a support adapted to be placed in contact with a portion of a body under conditions of use, the support comprising at least one complex of colloidal systems in dispersant phase, the colloidal systems including treated and modulated polymers.

10 Claims, 1 Drawing Sheet

RESONANCE DECOUPLING DEVICE FOR PROTECTING A HUMAN OR ANIMAL BODY AND METHOD OF PROTECTING AGAINST ELECTROMAGNETIC SIGNALS

RELATED APPLICATION

This is a continuation of International Application No. PCT/FR01/04041, with an international filing date of Dec. 18, 2001, which is based on French Patent Application No. 00/16499, filed Dec. 18, 2000, and French Patent Application No. 01/05738, filed Apr. 27, 2001.

TECHNICAL FIELD

This disclosure pertains to the field of protecting human or animal bodies. More particularly, the disclosure pertains to a resonance decoupling device for protecting a human or animal body.

BACKGROUND

It is known that the human or animal body picks up electromagnetic signals present in its environment such as, for example, electromagnetic signals emitted by electronic and/or electric devices such as portable telephones, computers, game consoles and the like. These signals can have a harmful influence on the health of the human or animal. It is also known that the human or animal body has its own electromagnetic signals. It would therefore be advantageous to provide a device for the protection of a human or animal body enabling resonance decoupling between the electromagnetic signals present in the environment of the body and the electromagnetic signals picked up by the body.

SUMMARY

I provide a resonance decoupling device for protecting a human or animal body including a support adapted to be placed in contact with a portion of a body under conditions of use, the support including at least one complex of colloidal systems in dispersant phase, the colloidal systems including treated and modulated polymers.

I also provide a method of activating a resonance decoupling device for protecting a human or animal body including applying sequential scanning of specific frequencies to a solution A containing Xx425 ml of colloidal solution including at least micelles (CaNa), $(2Al_5)$ and $(Si_5O_{20})$, applying a sequential scanning of specific frequencies to a solution B containing Xx425 ml of colloidal solution including at least micelles (CaNaMgFeAlTi) and (SiAl), mixing solutions A and B to form solution C, and allowing solution C to rest under vacuum, wherein X is a number.

I still further provide a method of protecting a human against electromagnetic signals including applying a resonance decoupling device to a portion of the human.

BRIEF DESCRIPTION OF THE DRAWINGS

Better understanding of my disclosure will be obtained from the description below provided in a purely explanatory manner of one mode of implementation. The description is made with regard to possibilities of application of my disclosure with reference to the attached figures.

DETAILED DESCRIPTION

Figure 1:
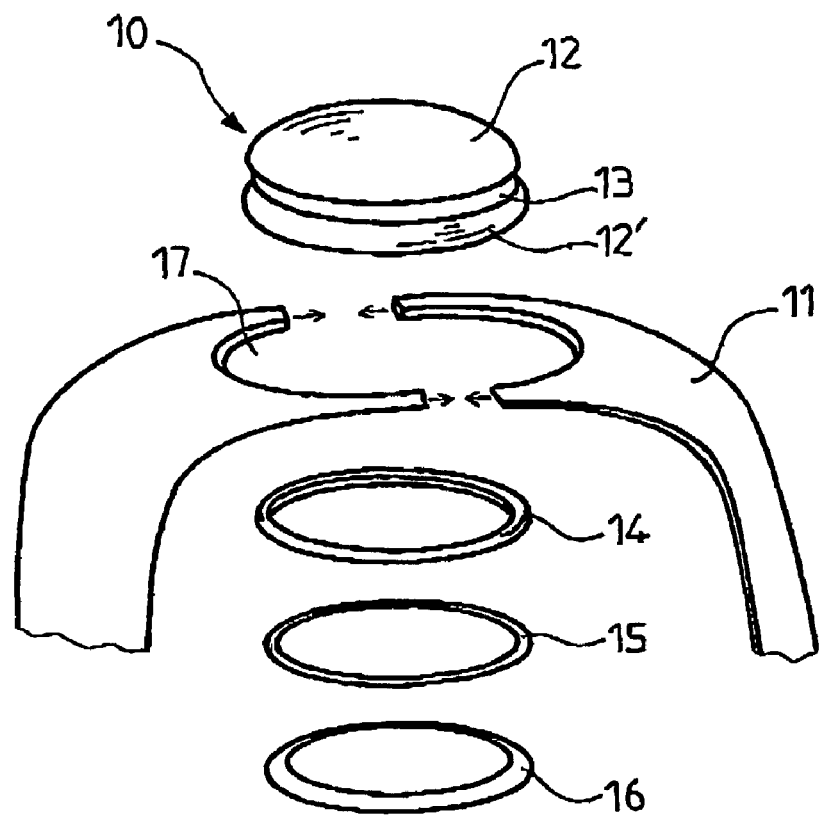
FIG. 1 illustrates a partial, exploded perspective view of a bracelet comprising a capsule.

My disclosure is remarkable in its broadest sense in that the device is constituted of a supported intended to be placed in contact with the body when in use, the support comprising at least one complex of colloidal systems in dispersant phase, the colloidal systems being constituted of treated and modulated polymers.

Decoupling is performed by modulating complexes of colloidal solutions over broad spectral zones, and notably in the zones used by electronic and/or electric devices. These conditions have the effect of piloting the nervous circuits responsible for the biocybernetics of the human organism in the manner of the systems used to permanently regulate the time of clocks performed by satellites.

In one aspect of my disclosure, the support is constituted of a piece of jewelry such as a watch, necklace, earring, pair of glasses or belt buckle. In another aspect, the support is constituted of a bracelet. In yet another aspect, the support is constituted of a piece of furniture such as a table, chair, lamp or clock. In still another aspect of my disclosure, the support is constituted of a garment such as clothing, shoes, hat or cap. In another aspect, the support is constituted of an electronic and/or electric device such as a computer, telephone—especially a portable telephone, electronic game, headphones or speaker—especially a portable speaker.

The colloidal systems are preferably contained in a matrix or capsule. The colloidal systems comprise preferably at least alternatively or cumulatively the following micelles: (CaNa), $(2Al_5)$, $(Si_5O_{20})$, (CaNaMgFeAlTi), (SiAl). The colloidal systems preferably comprise micelles of a size equal to or smaller than about 0.001 micron.

The colloidal systems are preferably modulated using a complex of waves of specific modulated forms and a lower amplitude and a higher frequency than the characteristic carrier wave used relative to one or more electronic and/or electric devices against which protection is desired.

I also provide a method for implementing a resonance decoupling device characterized in that sequential scanning of specific frequencies is applied to a solution A containing Xx425 ml of colloidal solution comprising at least the micelles (CaNa), $(2Al_5)$ and $(Si_5O_{20})$, then sequential scanning of specific frequencies is applied to a solution B containing Xx425 ml of colloidal solution comprising at least the micelles (CaNaMgFeAlTi) and (SiAl), and in that solutions A and B are mixed to form a solution C which is allowed to rest under vacuum, wherein X is a number.

The sequential scanning of specific frequencies of solution A is performed using an induction frequency generator of sinusoidal and successive waves and the sequential scanning of specific frequencies of solution B is performed using a micropulse frequency generator with inverse polarity inductors generating a rectangular modulation wave.

Solution C must rest under vacuum for a duration of at least about 24 hours. The procedure is preferably performed at a temperature of about 25° C.

This method has essentially two embodiments. The first embodiment enables implementation of a specific device suitable for protection against a particular electronic and/or electric device. The second embodiment enables implementation of a general device suitable for protection against a variety of the usual, harmful electronic and/or electric devices.

In a first embodiment, the frequency scanning of solution A is performed between about 0 and about 2 GHz according to determined sequences and lasts approximately 20 minutes. The frequency scanning of solution B is performed according to determined sequences the fundamental carrier wave of which does not exceed about 20 kHz at a frequency characteristic of one or more electronic and/or electric devices and lasts approximately 30 minutes.

The treatment of each solution corresponds to the fabrication of a protective device designed to protect against one or more specific electronic and/or electric devices because the selection of sequences is based on the characteristic frequencies of this (these) electronic and/or electric device(s).

In a second embodiment, the frequency scanning of solution A is performed systematically between about 0 and about $10^{13}$ Hz and lasts for approximately 8 minutes. Solution A contains an uncut piece of schorl during the frequency scanning. The frequency scanning of solution B is performed systematically between about 0 and about $10^{13}$ Hz and lasts for approximately 8 minutes. Solution B contains a cut piece of quartz crystal during the frequency scanning. Solution C must rest under vacuum for a duration of at least about 72 hours. This step C is preferably performed at a temperature of about 35° C.

With both embodiments, after the resting step solution C is preferably contained in at least one matrix or encapsulated in at least one capsule.

A device implemented by the procedure of the first embodiment of the method advantageously provides protection against the action of personal devices that one uses often.

A device implemented by the procedure of the second embodiment of the method advantageously provides protection against the action of a variety of devices commonly used in the device's surroundings. This device implemented, for example, in the form of a bracelet, thus, provides protection against the electromagnetic wave emissions in environments in which they are particularly present notably due to the fact of intensive use of electronic and/or electric devices by other users such as, for example, airports or train stations.

My device is a device for decoupling of resonance between the electromagnetic signals emitted by electronic and/or electric devices and the electromagnetic signals picked up by the human body.

My device is characterized in that it is constituted by a support intended to be placed preferably in contact with the body under conditions of use, the support including at least one complex of colloidal systems in dispersant phase, the colloidal systems being constituted of treated and modulated polymers.

The colloidal systems are constituted of polymers treated by at least one generator of specific waves, preferably two generators of specific waves. The colloidal systems are modulated using a wave complex of specific modulated forms and a lower amplitude and a higher frequency than the characteristic carrier wave used relative to the electronic and/or electronic device(s) against which protection is desired.

The colloidal systems are contained in a matrix or encapsulated in a capsule (10) which is entirely filled and free of air bubbles.

An inventory of the minimum material required for the implementation of one embodiment of the device is set forth below:

an induction frequency generator of sinusoidal and successive waves (Generator 1),
a micropulse frequency generator with inverse polarity inductors generating a wave of rectangular modulation (Generator 2),
two ferromagnetic blocks of the following dimensions: 75×75×380 mm,
two Xx500 ml flasks made of white glass,
one Xx1000 ml flask made of brown glass,
one thermostatic chamber with air circulation,
absorber plugs,
two colloidal solutions of micelles of a size equal to or smaller than about 0.001 micron of the following formulas:
   $(CaNa) (2Al_5) (Si_5O_{20}) (6H_2O)$ for the first solution (solution A) and
   $(CaNaMgFeAlTi) (SiAl) 2(O_6)$ for the second solution (solution B),
distilled water (Water D) which will be used as the solvent for solutions A and B when the solutions are created, wherein X is a number.

Presentation of different steps for implementation of a first embodiment of the method:

1) Into an Xx500 ml white glass flask, pour Xx425 ml of solution A having a micelle concentration on the order of 0.3%. The closed flask filled in this manner is located at a distance of approximately 25 cm from each ferromagnetic block. This assembly is then placed in a thermostatic chamber with air circulation. The two blocks are connected to generator 1. Duration of action: 20 minutes. The sequential frequency scanning is positioned between 0 and 2 GHz, from approximately 0.1 Hz to 2 GHz. Each scanning is specific and corresponds to the fabrication of a protective device designed to protect against a specific electronic and/or electric device because it is based on the characteristic frequencies of this device.

Scanning is performed, for example, by sequences of 100 Hz, up to 10 MHz, then by sequences of 500 Hz up to 2 GHz following the paces of sinusoidal, alternating and successive waves. A pause duration of 7 seconds is observed every 11 seconds. The duration of rise of each carrier wave pulse is equal to its fall and is on the order of $\pm 10^{-2}$ seconds.

2) Into an Xx500 ml white glass flask pour Xx425 ml of solution B having a micelle concentration on the order of 0.5%. The closed flask is positioned at a distance of approximately 25 cm from each ferromagnetic block. The entire assembly is placed in a thermostatic chamber with air circulation. The two blocks are connected to generator 2. The activity time is 30 minutes. The scanning is specific and corresponds to the fabrication of a protective device designed to protect against one or more specific electronic and/or electric devices since they are based on the characteristic frequencies of this or these device(s).

Scanning is performed, for example, by 7.8-Hz sequences, observing a pause duration of 1 second after each 1-second pulse. The frequency of the fundamental carrier wave does not exceed 20 kHz. The modulated wave is rectangular. The sequential scanning is performed according to the alternating micropulses with very abrupt attack slope whose rise time is greater than their fall time and is respectively on the order of $+10^{-8}$ second and of $+10^{-3}$ second, then $-10^{-8}$ second and $-10^{-3}$ second.

3) Transfer solutions A and B into an Xx1000 ml brown glass flask to obtain solution C.
4) Store solution C in a thermostatic chamber in which a vacuum has been implemented.
5) Solution C is ready at the end of a minimum of 24 hours. It can then be contained in a matrix, for example, a composite material or encapsulated in a capsule.

Fabrication should be performed at a temperature of 25° C. (±0.5° C.).

Presentation of different steps for implementation of a second embodiment of the method:

1) Into an Xx500 ml white glass flask pour Xx425 ml of solution A having a micelle concentration on the order of 0.2%. The closed flask is located at a distance of approximately 25 cm from each ferromagnetic block. This assembly is then placed in a thermostatic chamber with air circulation. The two blocks are connected to generator 1. Duration of action: 8 minutes. The sequential frequency scanning is positioned between 0 and $10^{13}$ Hz, from approximately 0.1 Hz to $10^{13}$ Hz. The scanning is performed in a systematic manner up to the limit frequency of $10^{13}$. The fundamental wave employed is necessarily accompanied by waves of lower amplitude.

Scanning is performed, for example, by sequences of 100 Hz, up to 10 MHz, then by sequences of 500 Hz up to $10^{13}$ Hz etc. following the sequences of sinusoidal, alternating and successive waves. A pause duration of 1 second is observed every 1 second. The duration of rise of each carrier wave pulse is equal to its fall duration and is on the order of $\pm 10^{-2}$ seconds.

Preparation is preferably implemented in the presence of an uncut piece of schorl (tourmaline) immersed in solution A during the physical preparation of this solution, then removed after mixing of solution A with solution B. This piece of schorl is of a size such that the volume of solution A increases by Xx10 ml.

2) Into an Xx500 ml white glass flask pour Xx425 ml of solution B having a micelle concentration on the order of 0.3%. The closed flask is positioned at a distance of approximately 25 cm from each ferromagnetic block. The entire assembly is in a thermostatic chamber with air circulation. The two blocks are connected to generator 2. The activity time is 8 minutes.

Scanning is performed in a systematic manner from 0 to $10^{13}$ Hz, for example by 1-kHz sequences with a pause duration of 1 second after each 1-second pulse. The frequency of the wave associated with the fundamental carrier wave does not exceed $10^{13}$ Hz. The modulated wave is rectangular. The sequential scanning is performed according to the alternating micropulses with very abrupt attack slope whose rise time is greater than their fall time and is, respectively, on the order of $+10^{-8}$ second and of $+10^{-2}$ second, then $-10^{-9}$ second and $-10^{-3}$ second.

Preparation is preferably performed in the presence of a cut piece of quartz crystal immersed in solution B during the physical preparation of this solution, then removed before solution B is mixed with solution A. This piece of quartz crystal is of a size such that the volume of solution B increases by Xx5 ml.

3) Transfer solutions A and B into an Xx1000 ml brown glass flask to obtain solution C.

4) Store solution C in a thermostatic chamber in which a vacuum had been implemented, at a temperature of 35° C. (±0.5° C.).

5) Solution C is ready at the end of a minimum of 72 hours. It can then be contained in a matrix, for example, a composite material or encapsulated in a capsule.

Respecting these conditions makes it possible to obtain a product which remains effective and stable for at least three years.

In the two embodiments of the method described above, a "recording" of frequencies modifying the initial structure of the molecular arrangements of the base solution was performed which could be read by an adequate material. In the present case, it is found that the signals emit and receive the live cells that read solution C and are thereby "informed" and "recorded".

The reality of my decoupling system was verified on blood samples.

All substances are capable of displaying a light-polarization direction. It has been reported that rotatory polarization was inverted in relation to normal during the use of the previously cited tools (portable telephones, computers, game consoles and the like) and then became normal again after use of the disclosure for several weeks.

Moreover, it was observed that upon muscle effort, my disclosure enabled fatigue reduced by half over a given period, this being the conventionally accepted sign of better "immunologic alertness".

Moreover, tests carried out on the performance of the human central and autonomic nervous systems showed that the nervous interferences generally observed at the level of the emergent roots of the spinal cord as well as in their corresponding metameric zones upon use of the previously cited electronic and/or electric devices disappeared within several weeks after the use of my invention.

Triggering of ionic movements of the human interior environment generally disturbed by use of the previously cited electronic and/or electric devices returns to normal within several weeks after the beginning of use of the disclosure.

Triggering of ionic movements of the human interior environment generally disturbed by use of the previously cited electronic and/or electric devices returns to normal within several weeks after the beginning of use of the invention.

The electronic and/or electric devices for personal use produce certain signals identical to biological signals. In fact, the logarithmic distribution curve of spectral zones of frequencies used in human intercellular communications indicates that the two systems (computer/electronic/electric device and human body) operate on numerous common frequencies and therefore can easily enter into resonance. The only condition for avoiding this entry into resonance is to induce another resonance closer to the "biological standard" and thus capable of inducing a decoupling action with the entries into resonance capable of generating harmful biological effects.

The modes of use of a solution C contained in a matrix or encapsulated entirely to capacity of solution C in a capsule are numerous.

Figure 2:
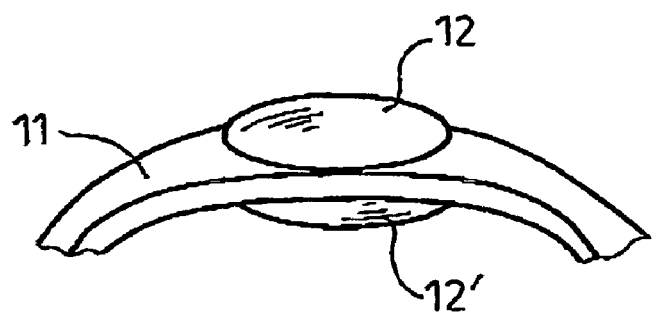
FIG. 2 illustrates a partial, perspective view of the assembled bracelet of FIG. 1.

Turning now to the drawings, FIGS. 1 and 2 illustrate a mode of implementation of my disclosure in which the support is constituted by a bracelet (11) comprising a capsule (10). The capsule (10) is constituted of two shells (12, 12') with circular openings and assembled along these openings. The assembly of the two shells creates a circular channel (13) in which is positioned a closing crown (14) then a rubber gasket (15) and a locking crown (16). This assembly is then inserted in a groove (17) in the bracelet (11). Closing means for the bracelet can be provided to facilitate closing the bracelet on the capsule along the arrows.

The capsule (10) has a diameter of approximately 30 millimeters and a height of approximately 15 millimeters. Its interior volume is at least about 8 ml. The capsule (10) is entirely filled with solution C. There are neither bubbles nor air. The top shell (12) preferably has an opaque surface and the bottom shell (12') in contact with the skin preferably has a transparent surface. The bracelet is, moreover, preferably curved such that it does not rotate around the arm and is always correctly positioned.

In the example cited above, the capsule (10) constitutes a decorative element. It is, of course, possible to have a capsule which is located under the face of a watch. It is also possible to implement the capsule in the form of a disk adhering directly to the skin by means of an adhesive.

It is possible to incorporate one or more matrices containing solution C and/or one or more capsules filled with solution C in garments. For example, it is possible to use a textile fiber microencapsulation technique. In the case of shoes, the capsule(s) can be incorporated in the soles.

It is also possible to incorporate one or more matrices containing solution C and/or one or more capsules filled with solution C in pieces of furniture.

It is also possible to incorporate one or more matrices containing solution C and/or one or more capsules filled with solution C directly in the electronic and/or electric devices against whose action preventive action is desired. For example, it is possible to incorporate a capsule directly in the protective housing of the device or in a housing that can be placed on the base housing.

My disclosure was described above as an example. It is understood that one of ordinary skill in the art could implement different variations without going beyond the scope of my disclosure, which is defined in the appended claims.

The invention claimed is:

1. A device that protects a human or animal body comprising a support placed into contact a portion of a human or animal body, said support comprising at least one complex of colloidal systems in a liquid dispersant phase, said colloidal systems comprising polymers and at least one micelle selected from the group consisting of $(CaNa)(2Al_5)(Si_5O_{20})(6H_2O)$, $(CaNaMgFeAlTi)(SiAl)2(O_6)$, $(CaNa)$, $(2Al_5)$, $(Si_5O_{20})$, $(CaNaMgFeAlTi)$ and $(SiAl)$.

2. The device according to claim 1, wherein said support is a bracelet.

3. The device according to claim 1, wherein said support is a piece of jewelry.

4. The device according to claim 1, wherein said support is a piece of furniture.

5. The device according to claim 1, wherein said support is a garment.

6. The device according to claim 1, wherein said support is an electronic and/or electric device.

7. The device according to claim 1, wherein said colloidal systems are contained in a matrix or encapsulated in a capsule.

8. The device according to claim 1, wherein said colloidal systems comprise micelles of a size less than or equal to about 0.001 micron.

9. The device according to claim 1, wherein said colloidal systems are modulated using a wave complex of specific modulated forms and an amplitude lower and a frequency higher than the characteristic carrier wave used relative to one or more electronic and/or electric devices against which it is desired to be protected.

10. A method of protecting a human against electromagnetic radiation comprising applying a device according to claim 1 to a portion of the human.

* * * * *